United States Patent [19]

Fouts

[11] 4,135,744

[45] Jan. 23, 1979

[54] TERMINAL FITTING FOR A TUBULAR CONDUIT

[75] Inventor: Robert E. Fouts, 2152 Van Karajan, San Pedro, Calif. 90732

[73] Assignee: Robert E. Fouts, Lawndale, Calif.

[21] Appl. No.: 685,742

[22] Filed: May 13, 1976

[51] Int. Cl.² .............................................. F16L 55/00
[52] U.S. Cl. ...................................... 285/253; 285/174
[58] Field of Search ................ 285/37, 251, 252, 253, 285/254, 420, 244, 369, 8, 38, 174, 45; 24/274 R, 279–286; 138/97, 99

[56] References Cited

U.S. PATENT DOCUMENTS

| | | | |
|---|---|---|---|
| 1,959,550 | 5/1934 | Schnaier | 285/244 |
| 2,333,350 | 11/1943 | Weatherhead | 285/251 |
| 2,688,498 | 9/1954 | Wilson | 285/37 |
| 3,424,482 | 1/1969 | Ligon | 24/274 R |
| 3,526,416 | 9/1970 | Kish | 285/253 X |
| 3,586,354 | 6/1971 | Boscacci | 285/369 |
| 3,813,116 | 5/1974 | Horsley | 285/236 |
| 3,884,509 | 5/1975 | Marsh | 285/37 |

FOREIGN PATENT DOCUMENTS 1001520 8/1965 United Kingdom ................. 285/420

*Primary Examiner*—Dave W. Arola
*Attorney, Agent, or Firm*—Poms, Smith, Lande & Glenny

[57] ABSTRACT

A terminal fitting for a tubular conduit has external housing means for protecting a terminal portion of the tubular conduit; the external housing means has internal clamping means for securing the tubular conduit to a separate attachment nipple, internal abutment means for limiting the axial movement of the tubular conduit with respect to the external housing means when the internal clamping means is disengaged, internal annular recess means for receiving the clamping means when the clamping means is disengaged, aperture means for providing access to the internal clamping means and tightening means accessible through the aperture means for tightening the internal clamping means.

1 Claim, 7 Drawing Figures

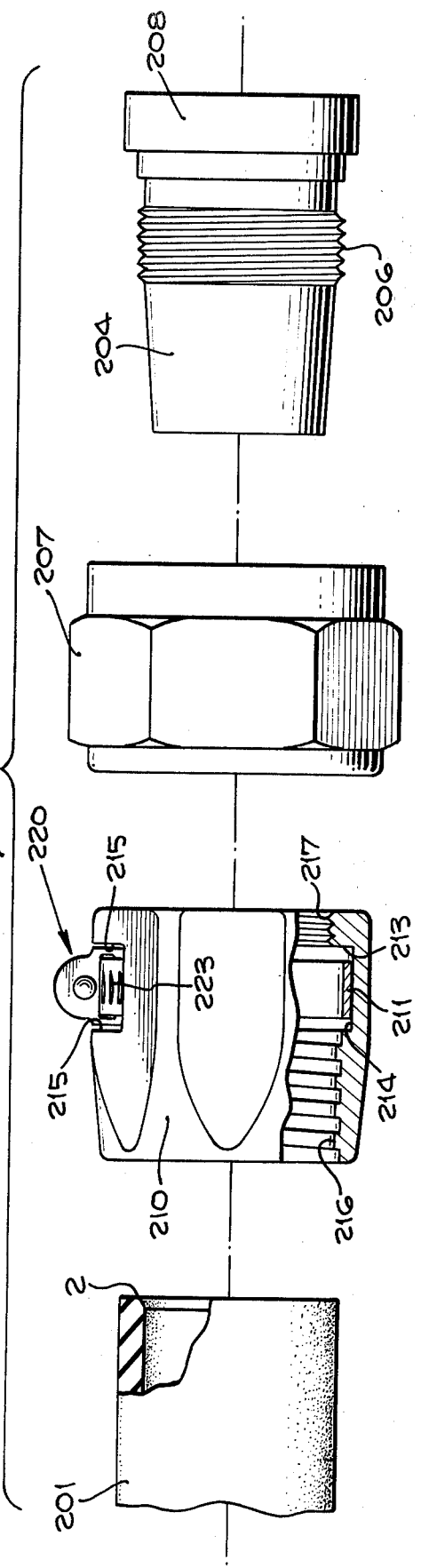
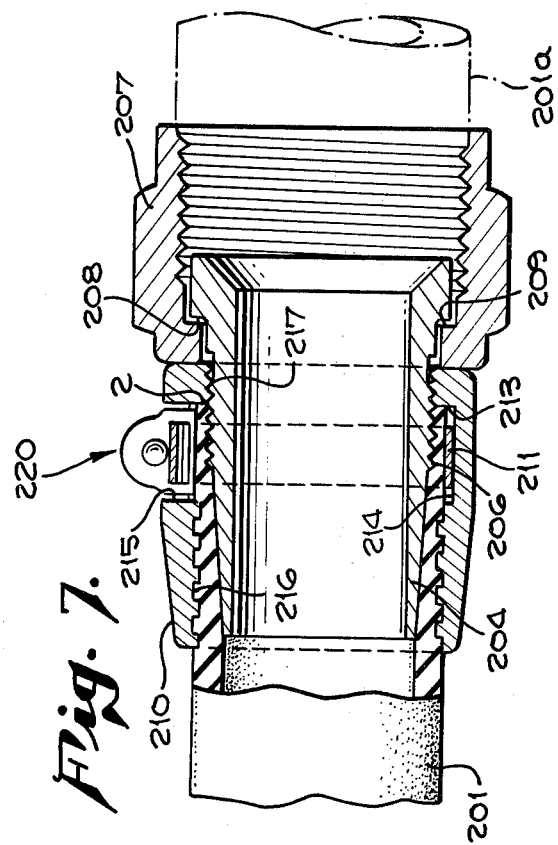
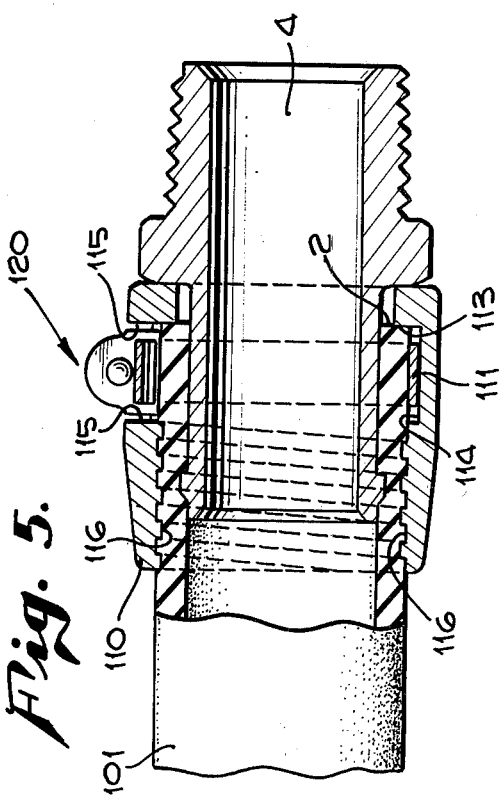

4,135,744

TERMINAL FITTING FOR A TUBULAR CONDUIT

BACKGROUND OF THE INVENTION

The present invention relates in general to fittings for tubular conduits. In particular, the present invention relates to terminal fittings and couplings for hydraulic systems which utilize tubular conduits to transport fluid.

Prior art couplings and terminal fittings have utilized the familiar worm gear clamp or snap ring clamp to compress a resilient conduit to conform to a separate attachment nipple which is inserted into the central bore of the tubular conduit.

This compression provides a leak-proof seal between the conduit and the nipple.

A prime disadvantage of the simple worm gear clamp or snap ring clamp is that these mechanisms do not protect the terminal end of the conduit from abrasion or cutting. Should the terminal portion of the conduit become cut or abraded, the seal between the attachment nipple and the conduit will fail and the fitting will leak.

In prior art attempts to provide protection for the terminal portion of hydraulic conduits an external housing has been provided. These prior art housings have, in general, been provided with internally threaded portions which enable the coupling to be screwed onto the end of a resilient conduit. The conduit conforms to the internal threads, and self-threads to form a leak-proof seal between the conduit and housing. The separate attachment nipple is then connected directly to the housing.

The principal disadvantages of these prior art attempts to protect the terminal portion of the tubular conduits are first, the seal strength and attachment strength between the conduit and the housing are limited by the shear modulus of deformation of the conduit material with respect to the thread cross-section and pitch. Second, if the use of armored conduit for high pressure applications is desired, it is impractical to use the self-threading method of housing attachment due to the force required to screw on the housing and the non-homogeneous surface contact between the housing and the conduit armor layer which will prevent a leak-proof seal.

It can be readily seen from the foregoing discussion that there is a need for improvement over the prior art solutions to the problems of conduit fittings and attachment methods. A highly desirable improvement would combine a terminal housing to protect the conduit with a mechanism which provided a positive leak-proof attachment between the conduit, the housing and the separate attachment nipple regardless of the materials from which the conduit, housing or nipple were fabricated.

SUMMARY OF THE INVENTION

It is therefore, an object of the present invention to disclose and provide external housing means which protect the terminal portion of a tubular conduit and which incorporate mechanical internal clamping means within the housing means which will provide a strong attachment and leak-proof seal between a separate attachment nipple and the housing/conduit assembly in all cases, particularly when armored conduit is employed in high pressure applications.

Generally stated, the present invention in an improved terminal fitting for a tubular conduit includes the provision of external housing means for protecting a terminal portion of a tubular conduit. The external housing means is provided with internal clamping means for securing the tubular conduit to a separate attachment nipple and providing a leak-proof seal therebetween.

Internal abutment means are provided for limiting axial movement of the tubular conduit with respect to the external housing means when the internal clamping means is disengaged. An internal annular recess means is provided within the external housing means for receiving the internal clamping means and providing clearance between the internal clamping means and the tubular conduit when the internal clamping means is disengaged.

The internal clamping means is provided with tightening means accessible through aperture means in a portion of the external housing means to assure a leak-proof connection between the tubular conduit and the separate attachment nipple in cases where a less than optimum size interrelationship exists therebetween.

A more complete understanding of the improvement in terminal fittings for tubular conduits in accordance with the present invention, as well as a recognition of additional objects and advantages therefore, will be afforded to those skilled in the art from a consideration of the following detailed description of an exemplary embodiment thereof. Reference will be made to the appended sheets of drawings which will first be discussed briefly.

BRIEF DESCRIPTION OF THE DRAWINGS

FIG. 5 is a side-sectional view of the terminal fitting of the present invention showing an embodiment of the improvement thereof which comprises an internally threaded external housing means for mating with a resilient conduit wall.

FIG. 6 is a exploded view of the terminal fitting of the present invention showing an embodiment of the improved housing means which is internally threaded for attachment to both the tubular conduit and a threaded separate attachment nipple.

FIG. 7 is a side sectional view of the embodiment of the present invention from FIG. 6 showing the inter-relationship between the conduit, improved external housing means of the present invention and a threaded separate attachment nipple.

DETAILED DESCRIPTION OF AN EXEMPLARY EMBODIMENT

Figure 1:
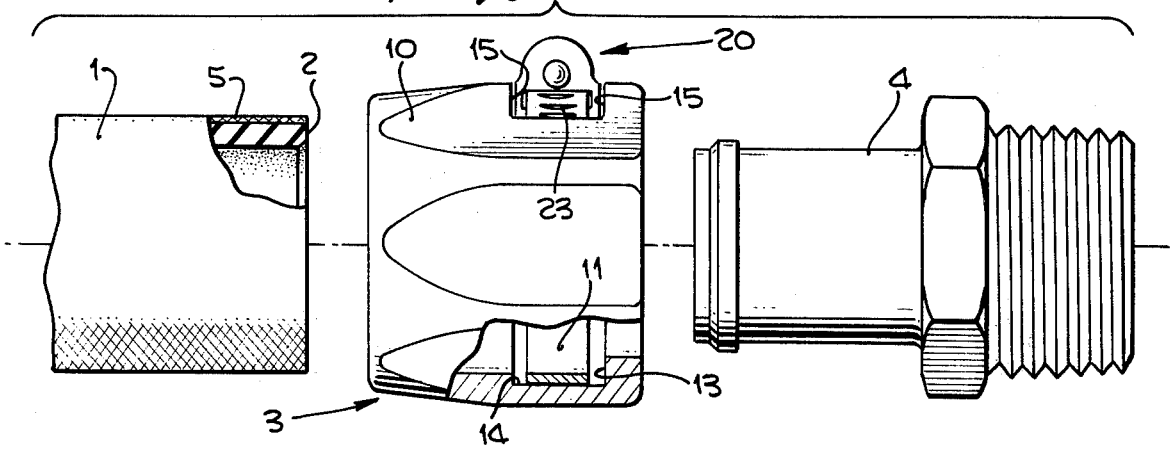
FIG. 1 is an exploded view of the terminal fitting for tubular conduits of the present invention showing the tubular conduit, the improved external housing means and a separate attachment nipple.

Referring initially to FIG. 1, a terminal fitting for a tubular conduit 1 is shown generally at 3. Terminal fitting 3 comprises external housing means 10 for protecting a terminal portion 2 of tubular conduit 1 from abrasion, cutting and fraying. Additionally, in high pressure applications which require the use of armored circuit, such armor 5 consisting of woven metallic fabric or the like, the external housing means covers the sharp edges produced when the armored conduit is cut to length during assembly of a conduit coupling. This housing protects the operator from injury and prevents the armour 5 from from fraying and introducing bits of metallic armor fabric to the environment within which the conduit application exists.

Figure 2:
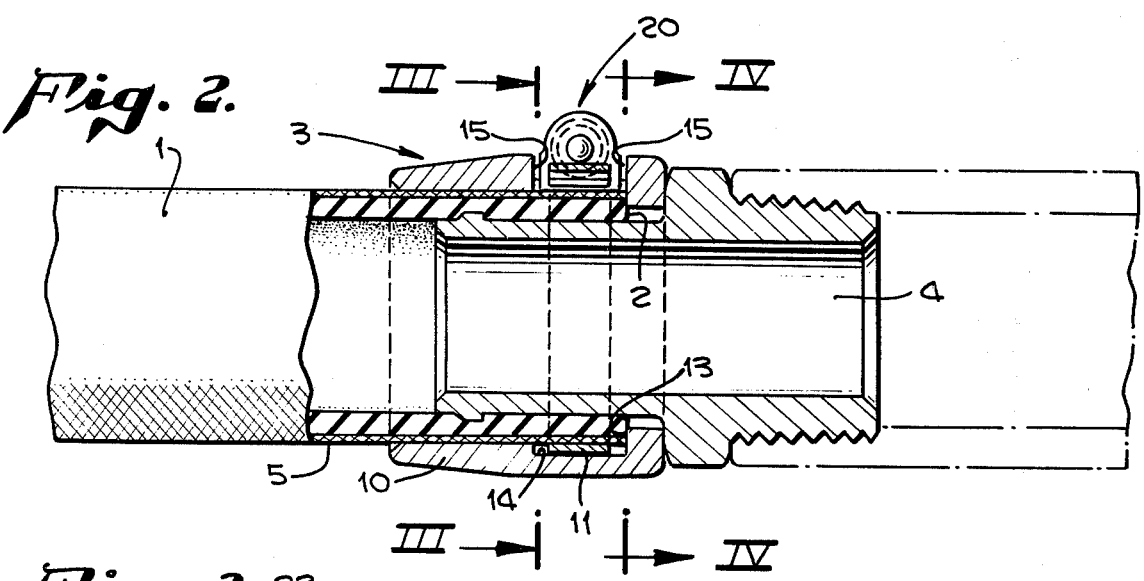
FIG. 2 is a partial side-sectional view of the terminal fitting showing the inter-relationship between the conduit, the improved external housing means of the present invention and a separate attachment nipple.
Figure 3:
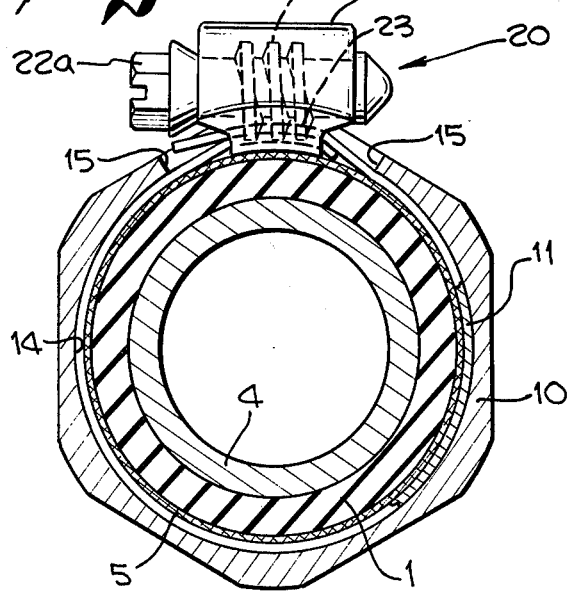
FIG. 3 is a sectional view through the plane III—III of FIG. 2 showing the same inter-relationship of elements as well as a detail of internal clamping means and adjustment means therefor.

Internal clamping means 11 are provided in combination with external housing means 10 for securing tubular conduit 1 to a separate attachment nipple 4 and providing a leak-proof connection therebetween, as is best seen in FIGS. 2 and 3. The use of clamping means 11 is particularly desirable in high pressure applications where armored conduit is dictated. In these types applications, the added security of clamping means 11 obviates any problems of obtaining an adequate seal between conduit 1 and nipple 4 and removes any necessity for a leakproof seal between housing 10 and conduit 1.

Internal abuttment means 13 are provided within external housing means 10 for limiting the axial movement of conduit 1 with respect to housing 10 when internal clamping means 11 is disengaged. Abuttment means 13 is best seen in FIG. 1, while the interrelationship between abuttment means 13 and terminal portion 2 of conduit 1 is best seen in FIG. 2.

Internal annular recess means 14 is provided within external housing means 10 for receiving clamping means 11 when clamping means 11 is disengaged as is best seen in FIG. 2. Thus, clearance is provided between clamping means 11 and conduit 1 which allows unimpeded attachment and removal of terminal fitting 3 and external housing means 10 with respect to conduit 1.

The provision of clearance between clamping means 11 and conduit 1 is particularly advantageous when armored conduit is used, as any impediment to the attachment or removal of housing 10 with respect to conduit 1 would fray or bend the metallic fabric 5. Additionally, it would require excessive pressure to force armored conduit past a constrictive clamping means during assembly of the terminal fitting and external housing means to the tubular conduit.

Figure 4:
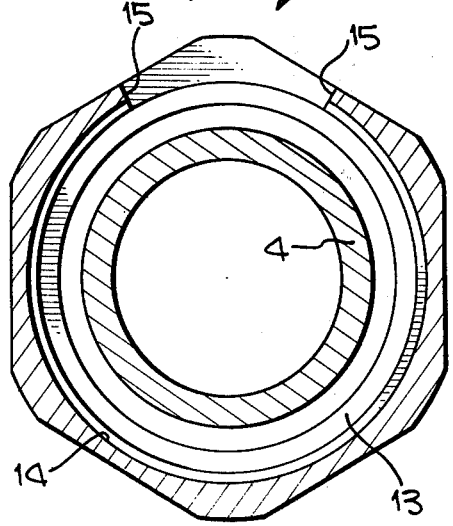
FIG. 4 is a sectional view through the plane IV—IV of FIG. 2 which shows the improved external housing means of the present invention and the elements thereof comprising external housing means, internal abutment means, internal annular recess means and adjustment aperture means.

External housing means 10 is provided with aperture means 15 through a portion thereof. Aperture means 15 provides access to internal clamping means 11, as is best seen in FIGS. 1, 3 and 4.

Internal clamping means 11 is provided with tightening means, shown generally at 20, which is accessible through aperture means 15 as can be more clearly seen in FIGS. 1, 2 and 3.

In the exemplary embodiment of the present invention, tightening means 20 comprises housing 21 which contains worm 22 and retains said worm in intimate intermeshing contact with gear slots 23 in clamping means 11, thereby comprising, in combination, a worm gear clamp.

Tightening means 20 provides a range of variable adjustment of internal clamping means 11 and further assurance of a leak-proof connection between tubular conduit 1 and separate attachment nipple 4. Tightening means 20 is particularly advantageous in allowing the use of conduits having various wall thickness for a given internal bore diameter with separate attachment nipples of a standard size for the given conduit bore size, in that the sealing properties of the connection are controlled by tightening means 20 and are not dependent on the inherent properties of the conduit itself. This flexibility in application facilitates the use of standardized external housing means 10 and separate attachment nipples 4 and results in simplified logistics and inventory control without sacrificing the quality of the conduit connection.

Additionally, tightening means 20 allows the use of conduit which may be slightly oversized for a given separate attachment nipple 4 while still assuring a leak-proof seal.

The improved terminal fitting of the present invention may, in a further exemplary embodiment comprise internal thread means 116 within external housing means 110 in combination with internal clamping means 111, to provide a form, leak-proof mechanical seal and attachment of external housing means 110 to tubular conduit 111, as best seen in FIG. 5. In use, pliable tubular conduit 101 is "screwed into" internal thread means 116 as is best seen in FIG. 5. This embodiment is particularly advantageous in applications which utilize pliable, non-armored conduit which is capable of resiliently conforming to internal thread means 116, as it provides a further leak-proof fit in addition to that provided by clamping means 101.

An additional exemplary embodiment of the improved terminal fitting of the present invention comprises internal thread means 217 within external housing means 210, as best seen in FIGS. 6 and 7, for providing a firm, leak-proof mechanical seal and attachment between external housing means 210 and an externally threaded separate attachment nipple 204. The externally threaded portion 206 of attachment nipple 204 utilized in the instant embodiment of the present invention in improved external housing means 210, engages internal thread means 217 of external housing means 210. Lock collar 207, having internal shoulder 209 which abutts flange 208 of attachment nipple 204 secures attachment nipple 204 to a second conduit 201a.

Having thus described improvements in external housing means for a terminal fitting for tubular conduits, it should be understood by those skilled in the art that various alternatives and modifications thereof may be made within the scope and spirit of the present invention which is defined by the following claims.

I claim:

1. A protective device for a terminal portion of a tubular conduit having marginal end portions susceptible to fraying in use when attached to a separate tubular nipple for communicating pressurized fluid therebetween, said protective device comprising:

a substantially non-compressible housing having a central longitudinal bore therethrough defined by interior wall portions thereof for receiving said terminal portion of said conduit;

abutment means integral of said housing and extending radially inwardly relative to said central bore from said interior wall portions of said housing which define said central bore for restricting axial movement of said conduit through said central bore, said housing providing an encompasing supportive contact with end marginal areas of said conduit by said interior wall portions adjacent said abutment means;

non-compressible clamping means generally internal of said central bore and having adjusting means therefor extending external of said housing through an aperture in a wall portion thereof for securing said housing to said conduit and for securing said conduit with respect to said attachment nipple; and annular recess means integral of said housing and located in said interior wall portions adjacent said abutment means for receiving said clamping means positioned about said conduit end marginal areas within said housing whereby, as said clamping means is disengaged and withdrawn into said annular recess means, clearance is provided between said clamping means and said tubular conduit to allow unimpeded attachment and removal of said terminal fitting with respect to said conduit and when said clamping means engages said conduit to hold said conduit to said nipple, said housing protects said conduit end marginal areas against fraying.

* * * * *